July 13, 1965 A. L. CLAPS 3,194,970
THEFT PROOF SYSTEM FOR AUTOMOTIVE IGNITION SYSTEMS
Filed Aug. 15, 1962
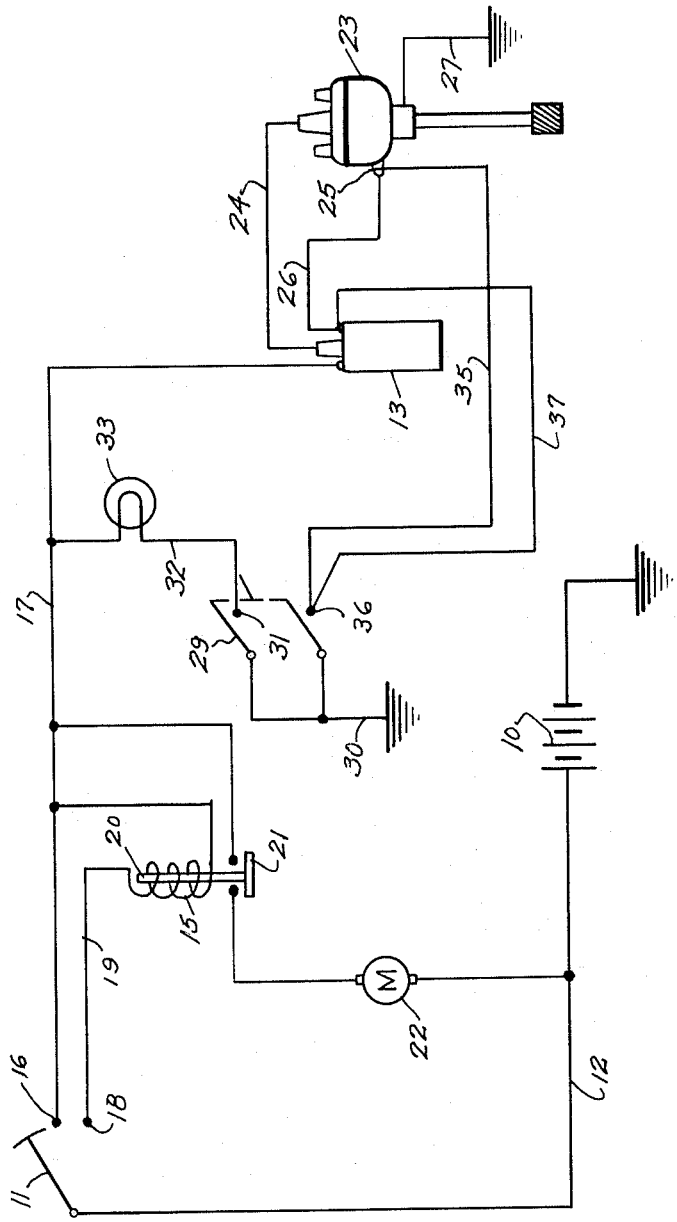
INVENTOR.
Albert L. Claps
BY
ATTORNEYS

United States Patent Office 3,194,970
Patented July 13, 1965

3,194,970
THEFT PROOF SYSTEM FOR AUTOMOTIVE
IGNITION SYSTEMS
Albert L. Claps, Elkgrove, Ill., assignor to Magnatronics,
Villa Park, Ill., a corporation of Illinois
Filed Aug. 15, 1962, Ser. No. 217,010
1 Claim. (Cl. 307—10)

This invention relates to a theft proof system for automotive vehicles and more particularly relates to an improved form of theft proof ignition system.

A principle object of the present invention is to provide a novel and improved theft proof system for automotive vehicles so arranged as to prevent starting of the car by jumping the starter switch.

A further object of the invention is to provide an improved form of theft proof system for automotive vehicles in which starting of the car is prevented by connecting a selectively operable ground connection in the ignition system to ground the system when the car is locked.

Still a further object of the invention is to provide an improved system for preventing the starting of the engine of an automotive vehicle without disconnecting the battery from the ignition system, by grounding the output of the primary of the ignition coil, at the selection of the operator of the vehicle.

A still further object of the invention is to provide an auxiliary switch for the ignition system of an automotive vehicle concealed from view and connected with the output of the primary of the ignition coil, to ground the ignition coil upon closing of the switch.

Still another object of the invention is to provide a theft proof ignition system for automotive vehicles in which a ground wire is connected to the output of the primary of the ignition coil by operation of a concealed switch, and in which the ground connection includes a wire made from a material difficult to cut.

These and other objects of the invention will appear from time to time as the following specification proceeds and with reference to the accompanying drawing, showing an illustrative form of wiring diagram embodying the principles of the invention.

In the embodiment of the invention illustrated in the drawing, I have diagrammatically shown a conventional automotive starter and ignition circuit including a storage battery 10 having connection with an ingnition and starter switch 11 through a conductor 12. The ignition and starter switch 11 may be of any conventional form, and may be a key operated type of switch completing a circuit to an ignition coil 13 and to a solenoid coil 15, when moved into position to close a circuit from the conductor 12 to a contact 16 and a conductor 17, connected with the primary of the ignition coil 13, and to a contact 18 and conductor 19 connected with the solenoid coil 15, for energizing said solenoid coil.

Upon energization of the solenoid coil 15, an armature 20 will be picked up to close a switch 21 and complete a circuit to a starter motor 22. As the engine starts and the hand is taken from the starter switch, a spring or other device will move the switch 11 to open the circuit to the solenoid coil 15 and maintain the circuit through the conductor 17 and primary of the ignition coil 13, in a conventional manner.

The secondary of ignition coil 13 is connected with a distributor 23 through a conductor 24. The output side of the primary of the ignition coil 13 in turn is connected with a connector 25 of the distributor 23 through a conductor 26. The connector 25 is connected to a condenser (not shown) connected to the distributor contacts and connected to ground through a ground connection 27.

The foregoing circuit just described is a conventional circuit so the details thereof need not herein be shown or described further.

Referring now in particular to the novel features of the invention, I have diagrammatically shown a double pole single throw switch 29 connected to ground through a conductor 30. One pole of the switch 29 completes a circuit from a contact 31 to ground 30, upon closing the switch. The contact 31 is connected with a conductor 32 connected with the conductor 17 and having a pilot lamp 33 connected in said conductor and lighting upon closing of the switch 29 when the ignition switch 11 is turned to an on position to complete a circuit through the contact 16 and conductor 17 to the primary of the ignition coil 13. A second pole of the switch 29 closes a circuit from a conductor 35 to the ground connection 30 through a contact 36 of said switch. The conductor 35 is connected with the conductor 26 leading from the primary of the ignition coil 13 through the connector 25, and thereby connects the output of the primary of the ignition coil 13 to ground and shorts the distributor points out of the ignition circuit. When the switch 29 is closed, the distributor points being shorted out of ignition circuit, the engine will not start.

I have also shown a conductor 37 connected between the output of the primary of the ignition coil 13 and the contact 36 of the switch 29. This second conductor is provided to provide a wire separate from the wire 35, which may follow a different path than the wire 35, to provide protection in case one wire should be located and severed.

The conductors 35 and 37 may be hidden and may be made from a copper wire and may be concealed so they won't readily be joined and may also be made from a material difficult to cut, such as a hardened steel.

The switch 29 may be concealed underneath the instrument panel of the vehicle or in any other suitable location and may be a key operated switch. The switch 29 may also be incorporated in the ignition switch if desired.

It may further be seen that the ignition system of the invention may be in the form of a compact switching unit which may be concealed in various locations in the automotive vehicle and which requires merely one or more wires, which may be concealed or may be made from a material difficult to cut, which may be connected to the output side of the primary of the ignition coil, to prevent starting of the vehicle upon closing of the switch.

It may further be seen that the ground connection may be at various places in the ignition system and that by the simplicity of the invention the reason for the failure of the automotive engine to start will be difficult to detect, even by an experienced automobile mechanic, and that the safety system of the invention makes it impossible to start the automotive vehicle by jumping the ignition system.

While I have herein shown and described one form in which my invention may be embodied, it may readily be understood that various variations and modifications in the invention may be attained without departing from the spirit and scope of the novel concepts thereof, as defined by the claim appended hereto.

I claim as my invention:
In a theft proof system for automotive vehicles,
an ignition system including a battery,
an ignition switch,
an ignition coil and a distributor,
said ignition coil having a primary and a secondary,
a first conductor connecting said battery to said ignition switch, a second conductor connecting said ignition switch to the primary of said ignition coil, a third conductor connecting the secondary of said ignition coil to said distributor, a fourth conductor connecting the output side of the primary of said ignition coil to said distributor, a fifth conductor connecting said distributor to ground, and a safety switch remote from said ignition switch and operable independently of said ignition switch having at least two terminals, one being connected to said fourth conductor and the output of the primary for said ignition coil and the other being connected to ground, whereby said coil is grounded and said distributor is short circuited from the ignition circuit, upon the closing of said safety switch, and a pilot light connected from said second conductor to said safety switch and energized through said safety switch to signal when the safety switch is closed, upon the closing of said ignition switch.

References Cited by the Examiner

UNITED STATES PATENTS

| | | | |
|---|---|---|---|
| 2,606,626 | 8/52 | Meyer | 307—10 |
| 2,820,149 | 1/58 | Roth | 307—10 |
| 2,931,918 | 4/60 | Shapiro | 307—10 |
| 3,158,749 | 11/64 | McAllister | 307—10 |

LLOYD McCOLLUM, *Primary Examiner.*